(12) United States Patent
Xu et al.

(10) Patent No.: US 11,313,698 B2
(45) Date of Patent: Apr. 26, 2022

(54) METHOD FOR INITIAL ALIGNMENT OF RADAR ASSISTED AIRBORNE STRAPDOWN INERTIAL NAVIGATION SYSTEM

(71) Applicant: Harbin Engineering University, Harbin (CN)

(72) Inventors: Bo Xu, Harbin (CN); Lianzhao Wang, Harbin (CN); Lei Wu, Harbin (CN); Shengxin Li, Harbin (CN); Jiao Zhang, Harbin (CN); Kunming Jin, Harbin (CN); Yu Guo, Harbin (CN); Dalong Zhang, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 122 days.

(21) Appl. No.: 16/922,241

(22) Filed: Jul. 7, 2020

(65) Prior Publication Data

US 2021/0080287 A1    Mar. 18, 2021

(30) Foreign Application Priority Data

Sep. 18, 2019    (CN) .......................... 201910882454.9

(51) Int. Cl.
*G01C 25/00*    (2006.01)
*G01C 21/16*    (2006.01)

(52) U.S. Cl.
CPC ....... *G01C 25/005* (2013.01); *G01C 21/1652* (2020.08)

(58) Field of Classification Search
None
See application file for complete search history.

(56) References Cited

U.S. PATENT DOCUMENTS

2013/0069819 A1\*  3/2013  Braun ................... G01S 13/935
                                                   342/156

\* cited by examiner

*Primary Examiner* — Raul J Rios Russo
*Assistant Examiner* — Carl F. R. Tchatchouang
(74) *Attorney, Agent, or Firm* — WPAT, PC

(57) ABSTRACT

The invention provides a method for initial alignment of radar assisted airborne strapdown inertial navigation system. By calculating the slant distance and angular position between the radar and the airborne inertial navigation equipment, a nonlinear measurement equation for the initial alignment of the radar assisted inertial navigation system is obtained. The unscented Kalman filter algorithm is used to estimate and compensate the error amount of strapdown inertial navigation system to complete the initial alignment task. The significance of the present invention is to provide an in-flight initial alignment solution when the global positioning system is limited, which has fast convergence speed and high estimation accuracy and has high engineering application value.

3 Claims, 3 Drawing Sheets

METHOD FOR INITIAL ALIGNMENT OF RADAR ASSISTED AIRBORNE STRAPDOWN INERTIAL NAVIGATION SYSTEM

TECHNICAL FIELD

The invention relates to an alignment method, in particular to a method for initial alignment of radar assisted airborne strapdown inertial navigation system.

BACKGROUND TECHNOLOGY

The initial alignment technology of strapdown inertial navigation system is the key technology of inertial navigation, which directly affects the accuracy of inertial navigation. The current research on aerial alignment is mostly focused on the alignment of shipborne weapons, but the airborne strapdown inertial navigation system also needs to be restarted in special operations. At present, the commonly used in-flight alignment method is Global Positioning System (GPS) assisted alignment. Considering that GPS is susceptible to blockage restrictions and unavailability in wartime, it is particularly important to find other auxiliary methods to achieve SINS initial alignment under special circumstances. Its ranging range can reach thousands to tens of thousands of kilometers, the precision of angle measurement is high, and it has the characteristics of continuous tracking, high precision measurement and high data rate output. The setting is simple, which can be provided to the onboard navigation system via wireless transmission. At present, there is not much research on the initial alignment of radar-assisted inertial navigation equipment. Usually, the position information in the earth coordinate system output by the radar is directly used to construct the quantity measurement. In fact, this model is inaccurate. As the distance between the target and the radar increases, its linearized position error will become larger, that is, the measurement noise will also change. This is very unfavorable for the state estimation and usually causes a large alignment error.

SUMMARY OF THE INVENTION

The purpose of the present invention is to provide a method for initial alignment of radar assisted airborne strapdown inertial navigation system, which is a method of initial alignment in airborne strapdown inertial navigation system assisted with slant distance and angular position information measurement by radar.

The purpose of the present invention is achieved as follows:

Step 1: position and track the target aircraft through the tracking radar configured on the ship;

Step 2: tracking radar measures the slant distance, angular position of the target aircraft and the position of the radar will be provided to the airborne inertial navigation system through wireless transmission;

Step 3: construct the initial alignment state equation of strapdown inertial navigation system;

Step 4: construct a nonlinear measurement equation for strapdown inertial navigation system initial alignment;

Step 5: use the unscented Kalman filter to estimate and compensate the inertial navigation error.

The invention also includes such structural features:

1. Step 3 specifically includes:

A state X is selected as:

$$X=[\phi^T (\delta v^n)^T (\delta P)^T (\epsilon^b)^T (\nabla^b)^T]^T$$

Among them: n is the navigation coordinate system, which coincides with the local geographic coordinate system, and its x, y, and z axes point to east, north, and vertical, respectively; b is the carrier coordinate system, and its x, y, and z point to the right, front and top of the carrier, respectively; $\delta P=[\delta L\ \delta\lambda\ \delta h]^T$ is the position error vector, $\delta L$ is the latitude position error, $\delta\lambda$ is the longitude position error, $\delta h$ height position error; $\delta v^n = [\delta v_E\ \delta v_N\ \delta v_u]^T$ is the speed error vector, $\delta v_E$ is the eastward velocity error, $\delta v_N$ is the northward velocity error, $\delta v_u$ is the celestial velocity error; $\phi=[\phi_e\ \phi_n\ \phi_u]^T$ is the platform misalignment angle vector, $\phi_e$, $\Phi_n$ and $\Phi_u$ are the platform misalignment angles in the east, north, and vertical directions, respectively, $\epsilon^b = [\epsilon_x\ \epsilon_y\ \epsilon_z]^T$ is the constant drift vector of the gyro, $\epsilon_x$, $\epsilon_y$, and $\epsilon_z$ are the constant drifts of the gyro in the x, y, and z axes, respectively, $\nabla^b = [\nabla_x\ \nabla_y\ \nabla_z]^T$ is the accelerometer constant bias vector, and $\nabla_x$, $\nabla_y$ and $\nabla_z$ are the accelerometer constant bias in the x, y, and z axes;

According to the selected state parameters, the initial alignment state equation of the inertial navigation system is $$\begin{cases} \dot{\phi} = -\omega_{in}^n \times \phi + M_{12}\delta v^n + M_{13}\delta P - C_b^n(\epsilon^b + \epsilon_w^b) \\ \delta \dot{v}^n = (C_b^n f^b) \times \phi + (v^n \times M_{12} - [(2\omega_{ie}^n + \omega_{en}^n) \times])\delta v^n + M_{23}\delta P + C_b^n(\nabla^b + \nabla_w^b) \\ \delta \dot{P} = M_{32}\delta v^n + M_{33}\delta P \\ \dot{\epsilon}^b = 0 \\ \dot{\nabla}^b = 0 \end{cases}$$

Among them: $\omega_{in}^n = \omega_{ie}^n + \omega_{en}^n$ is the projection of rotation angular velocity of the navigation system relative to the inertial system in the navigation system, which includes two vector parts: $\omega_{ie}^n$ is the projection vector of the earth's rotation angular velocity in the navigation coordinate system, $\omega_{en}^n$ is the projection vector of the rotation angular velocity of the navigation system relative to the inertial system caused by the motion of the carrier on the surface of the earth in the navigation coordinate system.

$$\omega_{ie}^n = [0\ \omega_{ie}\cos L\ \omega_{ie}\sin L]^T, \omega_{en}^n = \left[\frac{-v_N}{R_h}\ \frac{v_E}{R_h}\ \frac{v_E \tan L}{R_h}\right]^T$$

and $\omega_{ie}$ the earth's rotation angular rate scalar, L is the local latitude, $R_h$ is the distance between the carrier and the center of the earth, where $R_h = R_e + h$, $R_e$ is the radius of the earth, h is the altitude of the carrier, $v^n = [v_E\ v_N\ v_u]^T$ is the projection of the carrier velocity vector in the navigation coordinate system. $v_E$, $v_N$, and $v_U$ are the east velocity, north velocity, and vertical velocity, respectively. $f^b$ is the specific force vector of the accelerometer output carrier coordinate system, $$M_{12} = \begin{bmatrix} 0 & -1/R_h & 0 \\ 1/R_h & 0 & 0 \\ \tan L/R_h & 0 & 0 \end{bmatrix},$$

$$M_{13} = \begin{bmatrix} 0 & 0 & 0 \\ -\omega_{ie}\sin L & 0 & 0 \\ \omega_{ie}\cos L & 0 & 0 \end{bmatrix} + \begin{bmatrix} 0 & 0 & v_N/R_h^2 \\ 0 & 0 & -v_E/R_h^2 \\ v_E\sec^2 L/R_h & 0 & -v_E\tan L/R_h^2 \end{bmatrix},$$

$$M_{23} = (v^n \times)\left(2 \cdot \begin{bmatrix} 0 & 0 & 0 \\ -\omega_{ie}\sin L & 0 & 0 \\ \omega_{ie}\cos L & 0 & 0 \end{bmatrix} + \begin{bmatrix} 0 & 0 & -v_N/R_h^2 \\ 0 & 0 & -v_E/R_h^2 \\ v_E\sec^2 L/R_h & 0 & -v_E\tan L/R_h^2 \end{bmatrix}\right),$$

$$M_{32} = \begin{bmatrix} 0 & 1/R_h & 0 \\ \sec L/R_h & 0 & 0 \\ 0 & 0 & 1 \end{bmatrix},$$

$$M_{33} = \begin{bmatrix} 0 & 0 & -v_N/R_h^2 \\ v_E \sec L \tan L/R_h & 0 & -v_E \sec L/R_h^2 \\ 0 & 0 & 0 \end{bmatrix} \text{ and }$$

$$C_b^n = \begin{bmatrix} T_{11} & T_{12} & T_{13} \\ T_{21} & T_{22} & T_{23} \\ T_{31} & T_{32} & T_{33} \end{bmatrix}$$

are the attitude matrix of the sub-inertial navigation, $T_{11}$, $T_{12}$, $T_{13}$, $T_{21}$, $T_{22}$, $T_{23}$, $T_{31}$, $T_{32}$ and $T_{33}$ are the elements of the attitude matrix, $\varepsilon_w^b = [\varepsilon_{wx}^b \ \varepsilon_{wy}^b \ \varepsilon_{wz}^b]^T$ the Gaussian white noise vector measured by the gyro, $\varepsilon_{wx}^b$, $\varepsilon_{wy}^b$ and $\varepsilon_{wz}^b$ are the x, y and z axis gyro measurement Gaussian white noise, $\nabla_w^b = [\nabla_{wx}^b \ \nabla_{wy}^b \ \nabla_{wz}^b]^T$ is the white Gaussian vector of accelerometer measurement, and $\nabla_{wx}^b$, $\nabla_{wy}^b$ and $\nabla_{wz}^b$ are the white Gaussian of x, y and z axial acceleration measurement.

2. Step 4 includes:

Measurement $Z=[R \ \beta \ \alpha]^T$ includes slant distance R, azimuth angle $\beta$ and pitch angle $\alpha$;

Among them:

$$Z = \begin{bmatrix} R \\ \beta \\ \alpha \end{bmatrix} = \begin{bmatrix} \sqrt{(dx^n)^2 + (dy^n)^2 + (dz^n)^2} \\ \arctan \dfrac{dz^n}{\sqrt{(dx^n)^2 + (dy^n)^2}} \\ \arctan \dfrac{dx^n}{dy^n} \end{bmatrix},$$

$[dx^n \ dy^n \ dz^n]^T = C_{P_o}^n [dx^e \ dy^e \ dz^e]^T$ and $[dx^n \ dy^n \ dz^n]^T$ are the relative position vector of the target and the radar in the navigation coordinate system, $C_{P_o}^n$ is the coordinate conversion matrix between the earth's rectangular coordinate system and the navigation coordinate system. The coordinate of the Earth's rectangular coordinate system is $$\begin{bmatrix} dx^e \\ dy^e \\ dz^e \end{bmatrix} = \begin{bmatrix} (R_e + h_p)\cos(L_p)\cos(\lambda_p) \\ (R_e + h_p)\cos(L_p)\sin(\lambda_p) \\ (R_e + h_p)\sin(L_p) \end{bmatrix} - \begin{bmatrix} x_{P_o}^e \\ y_{P_o}^e \\ z_{P_o}^e \end{bmatrix},$$

e represents the Earth's rectangular coordinate system. $L_p = L_p^s - \delta L$ is the true latitude, $\lambda_p = \lambda_p^s - \delta \lambda$ is true longitude, $h_p = h_p^s - \delta h$ is true altitude, and $L_p^s$, $\lambda_p^s$ and $h_p^s$ are the position resolved by the inertial navigation system.

Then the measurement equation for the initial alignment of the radar-assisted strapdown inertial navigation system is:

$$Z = H(\delta L, \delta \lambda, \delta h) + \begin{bmatrix} \omega_R \\ \omega_\beta \\ \omega_\alpha \end{bmatrix}$$

Among them: $\omega_R$, $\omega_\alpha$ and $\omega_\beta$ top are white noises that conform to the zero-mean Gaussian distribution, and the expression of the nonlinear function H can be obtained by the above substitution.

Compared with the prior art, the beneficial effects of the present invention are: the present invention is based on the slant distance and angular position provided by the radar, considering the transfer relationship between the positioning error of the strapdown inertial navigation system and the slant distance and angular position, the present invention proposes a new alignment scheme for the measurement model, which uses the slant distance and angular position as measurement information to achieve alignment. First, the present invention provides a new solution for the initial alignment of the airborne inertial navigation system when the global positioning system is blocked, and has high engineering application value. Second, compared with the traditional radar-assisted inertial navigation system initial alignment scheme, the advantages of the present invention are reflected in the fact that the position coordinates after the radar measurement parameters are linearized are not selected as the measurement, which avoids the problem of the statistical characteristics of the measurement noise changing with the distance. The invention directly uses the slant distance and angular position information obtained by radar measurement as the quantity measurement, and makes full use of the original measurement information. Since the statistical characteristics of the measurement noise meet the requirements of the optimal estimation, the Kalman filter method can be used to estimate the optimal status. At the same time, compared with the existing alignment scheme, the proposed scheme can complete the high-precision initial alignment task in a larger distance range.

BRIEF DESCRIPTION OF THE FIGURES

FIG. 4b is a comparison diagram of azimuth attitude error between the

DETAILED DESCRIPTION OF THE INVENTION

The present invention will be further described in detail below with reference to the drawings and specific embodiments.

Figure 1:
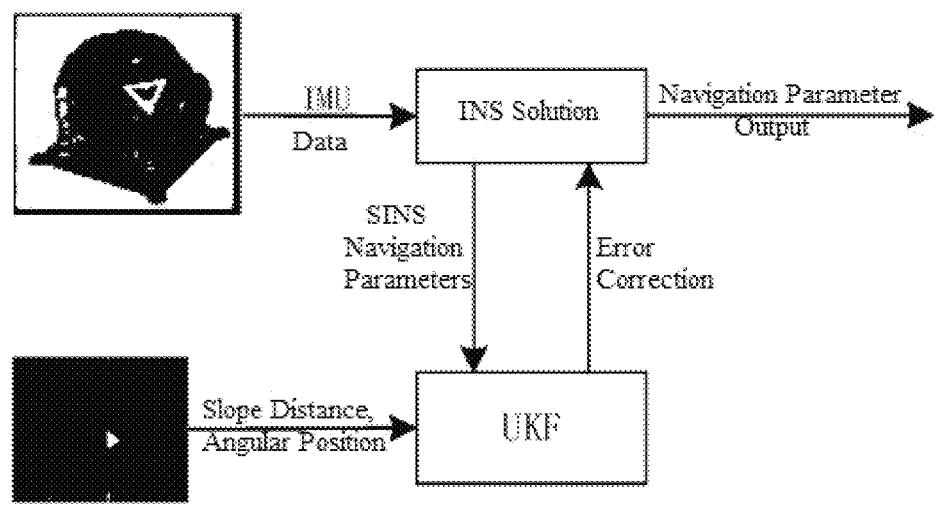
FIG. 1 is a schematic diagram of the present invention.
Figure 2:
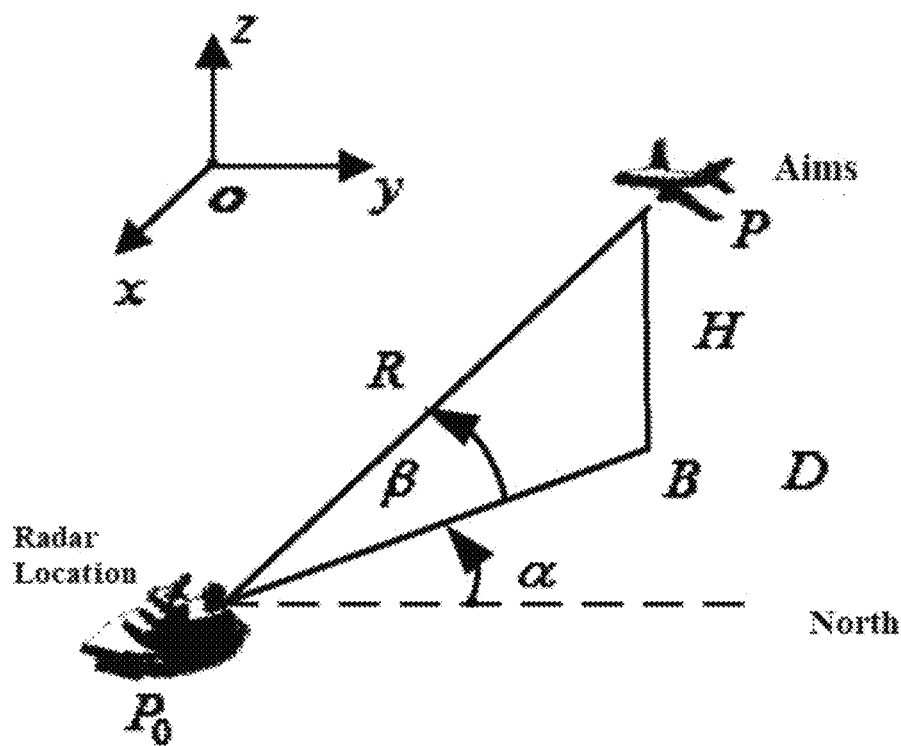
FIG. 2 is a description of the radar target measurement parameters of the present invention.

As shown in FIG. 1, it is a schematic diagram of an initial alignment solution for radar-assisted strapdown inertial navigation system provided by the present invention. The measurement noise statistical characteristics vary with the slant distance. The invention has the advantages of high alignment accuracy and short alignment time. It includes the following steps:

Step 1: the tracking radar is configured on the ship to locate and track the target aircraft. As shown in FIG. 2, $P_o$ is the location of the radar carrier, and the polar coordinates $P(R, \alpha, \beta)$ of any target P in the air are measured with it as the origin. R is called the slant distance, which is the linear distance from the radar to the target. $\alpha$ represents the azimuth angle, $\alpha$ represents the azimuth angle, which is the angle between PoB projected on the horizontal plane between the radar and the target line PoP and the true north direction on the horizontal plane. $\beta$ represents the elevation angle, which is the angle between the PoB projected on the horizontal plane between the radar and the target line PoP and the lead vertical plane. It is also called the inclination angle or the height angle.

Step 2: tracking radar measures the slant distance, angular position of the target aircraft and the location of the radar carrier will be provided to the airborne inertial navigation system through wireless transmission. The location $P_o$ of the radar carrier is provided by a high-precision inertial navigation device, and its positioning accuracy is high, so the influence of its position error can be ignored. Because of its high positioning accuracy, its position error can be ignored.

Step 3: construct the initial alignment state parameters and state equations of the strapdown inertial navigation system. The state quantity is selected as:

$$X = [\phi^T (\delta v^n)^T (\delta P)^T (\varepsilon^b)^T (\nabla^b)^T]^T$$

n is the navigation coordinate system, which coincides with the local geographic coordinate system, and its x, y, and z axes point to east, north, and vertical, respectively; b is the carrier coordinate system, and its x, y, and z point to the right, front and top of carrier; $\delta P = [\delta L \; \delta \lambda \; \delta h]^T$ is the position error vector, $\delta L$ is the latitude position error, $\delta \lambda$ is the longitude position error, $\delta h$ height position error; $\delta v^n = [\delta v_E \; \delta v_N \; \delta v_U]^T$ is the speed error vector, $\delta v_E$ is the eastward velocity error, $\delta v_N$ is the northward velocity error, $\delta v_U$ is the celestial velocity error; $\phi = [\phi_e \; \phi_n \; \phi_u]^T$ is the platform misalignment angle vector, $\Phi_e$, $\Phi_n$ and $\Phi_u$ are the platform misalignment angles in the east, north, and vertical directions, respectively, $\varepsilon^b = [\varepsilon_x \; \varepsilon_y \; \varepsilon_z]^T$ is the constant drift vector of the gyro, $\varepsilon_x$, $\varepsilon_y$ and $\varepsilon_z$ are the constant drifts of the gyro in the x, y, and z axes, respectively, $\nabla^b = [\nabla_x \; \nabla_y \; \nabla_z]^T$ is the accelerometer constant bias vector, and $\nabla_x$, $\nabla_y$, $\nabla_z$ is the accelerometer constant bias in the x, y, and z axes, and T represents transpose.

Further, according to the selected state parameters can be obtained inertial navigation system initial alignment state equation is:

$$\begin{cases} \dot{\phi} = -\omega_{in}^n \times \phi + M_{12} \delta v^n + M_{13} \delta P - C_b^n (\varepsilon^b + \varepsilon_w^b) \\ \delta \dot{v}^n = (C_b^n f^b) \times \phi + (v^n \times M_{12} - [(2\omega_{ie}^n + \omega_{en}^n) \times]) \delta v^n + M_{23} \delta P + C_b^n (\nabla^b + \nabla_w^b) \\ \delta \dot{P} = M_{32} \delta v^n + M_{33} \delta P \\ \dot{\varepsilon}^b = 0 \\ \dot{\nabla}^b = 0 \end{cases}$$

Among them, the point on the state quantity represents the first derivative. $\omega_{in}^n = \omega_{ie}^n + \omega_{en}^n$ is the projection of rotation angular velocity of the navigation system relative to the inertial system in the navigation system, which includes two vector parts: $\omega_{ie}^n$ is the projection vector of the earth's rotation angular velocity in the navigation coordinate system, $\omega_{en}^n$ is the projection vector of the rotation angular velocity of the navigation system relative to the inertial system caused by the motion of the carrier on the surface of the earth in the navigation coordinate system.

$$\omega_{ie}^n = [0 \;\; \omega_{ie} \cos L \;\; \omega_{ie} \sin L]^T, \; \omega_{en}^n = \left[ \frac{-v_N}{R_h} \;\; \frac{v_E}{R_h} \;\; \frac{v_E \tan L}{R_h} \right]^T$$

and $\omega_{ie}$ are the earth's rotation angular rate scalar, L is the local latitude, $R_h$ is the distance between the carrier and the center of the earth, where $R_h = R_e + h$, $R_e$ is the radius of the earth, h is the altitude of the carrier, $v_n = [v_E \; v_N \; v_U]^T$ is the projection of the carrier velocity vector in the navigation coordinate system. $v_E$, $v_N$, and $v_U$ are the east velocity, north velocity, and vertical velocity, respectively. $f^b$ is the specific force vector of the accelerometer output carrier coordinate system, $$M_{12} = \begin{bmatrix} 0 & -1/R_h & 0 \\ 1/R_h & 0 & 0 \\ \tan L/R_h & 0 & 0 \end{bmatrix},$$

$$M_{13} = \begin{bmatrix} 0 & 0 & 0 \\ -\omega_{ie} \sin L & 0 & 0 \\ \omega_{ie} \cos L & 0 & 0 \end{bmatrix} + \begin{bmatrix} 0 & 0 & v_N/R_h^2 \\ 0 & 0 & -v_E/R_h^2 \\ v_E \sec^2 L/R_h & 0 & -v_E \tan L/R_h^2 \end{bmatrix},$$

$$M_{23} = (v^n \times) \left( 2 \cdot \begin{bmatrix} 0 & 0 & 0 \\ -\omega_{ie} \sin L & 0 & 0 \\ \omega_{ie} \cos L & 0 & 0 \end{bmatrix} + \begin{bmatrix} 0 & 0 & v_N/R_h^2 \\ 0 & 0 & -v_E/R_h^2 \\ v_E \sec^2 L/R_h & 0 & -v_E \tan L/R_h^2 \end{bmatrix} \right),$$

$$M_{32} = \begin{bmatrix} 0 & 1/R_h & 0 \\ \sec L/R_h & 0 & 0 \\ 0 & 0 & 1 \end{bmatrix},$$

-continued $$M_{33} = \begin{bmatrix} 0 & 0 & -v_N/R_h^2 \\ v_E \sec L \tan L/R_h & 0 & -v_E \sec L/R_h^2 \\ 0 & 0 & 0 \end{bmatrix} \text{ and}$$

$$C_b^n = \begin{bmatrix} T_{11} & T_{12} & T_{13} \\ T_{21} & T_{22} & T_{23} \\ T_{31} & T_{32} & T_{33} \end{bmatrix}$$

are the attitude matrix of the sub-inertial navigation, $T_{11}$, $T_{12}$, $T_{13}$, $T_{21}$, $T_{22}$, $T_{23}$, $T_{31}$, $T_{32}$ and $T_{33}$ are the elements of the attitude matrix, $\varepsilon_w^b = [\varepsilon_{wx}^b \ \varepsilon_{wy}^b \ \varepsilon_{wz}^b]^T$ is the Gaussian white noise vector measured by the gyro, $\varepsilon_{wx}^b$, $\varepsilon_{wy}^b$ and $\varepsilon_{wz}^b$ are the x, y and z axis gyro measurement Gaussian white noise, $\nabla_w^b = [\nabla_{wx}^b \ \nabla_{wy}^b \ \nabla_{wz}^b]^T$ is the white Gaussian vector of accelerometer measurement, and $\nabla_{wx}^b$, $\nabla_{wy}^b$ and $\nabla_{wz}^b$ are the white Gaussian of x, y and z axial acceleration measurement.

Step 4: select the initial alignment measurement parameters of the strapdown inertial navigation system and construct a nonlinear measurement equation. In the existing initial alignment method of the radar-assisted strapdown inertial navigation system, the position error is selected as the measurement. In the present invention, the slant distance and the angular position are used as the measurement; then the measurement: $Z = [R \ \beta \ \alpha]^T$ is respectively slant distance R, azimuth angle $\beta$ and pitch angle $\alpha$.

Among them:

$$Z = \begin{bmatrix} R \\ \beta \\ \alpha \end{bmatrix} = \begin{bmatrix} \sqrt{(dx^n)^2 + (dy^n)^2 + (dz^n)^2} \\ \arctan \dfrac{dz^n}{\sqrt{(dx^n)^2 + (dy^n)^2}} \\ \arctan \dfrac{dx^n}{dy^n} \end{bmatrix},$$

$$[dx^n \ dy^n \ dz^n]^T = C_{p_o}^n [dx^e \ dy^e \ dz^e]^T$$

and $[dx^n \ dy^n \ dz^n]^T$ are the relative position vector of the target and the radar in the navigation coordinate system, $C_{p_o}^n$ is the coordinate conversion matrix between the earth's rectangular coordinate system and the navigation coordinate system. The coordinate of the earth's rectangular coordinate system is $$\begin{bmatrix} dx^e \\ dy^e \\ dz^e \end{bmatrix} = \begin{bmatrix} (R_e + h_p)\cos(L_p)\cos(\lambda_p) \\ (R_e + h_p)\cos(L_p)\sin(\lambda_p) \\ (R_e + h_p)\sin(L_p) \end{bmatrix} - \begin{bmatrix} x_{p_o}^e \\ y_{p_o}^e \\ z_{p_o}^e \end{bmatrix},$$

e represents the earth's rectangular coordinate system. $L_p = L_p^s - \delta L$ is the true latitude, $\lambda_p = \lambda_p^s - \delta \lambda$ is true longitude, $h_p = h_p^s - \delta h$ is true altitude, and $L_p^s$, $\lambda_p^s$ and $h_p^s$ are the position resolved by the inertial navigation system. Then the measurement equation for the initial alignment of the radar-assisted strapdown inertial navigation system is:

$$Z = H(\delta L, \delta \lambda, \delta h) + \begin{bmatrix} \omega_R \\ \omega_\beta \\ \omega_\alpha \end{bmatrix}.$$

$$Z = H(\delta L, \delta \lambda, \delta h) + \begin{bmatrix} \omega_R \\ \omega_\beta \\ \omega_\alpha \end{bmatrix},$$

$\omega_R$, $\omega_\alpha$ and $\omega_\beta$ are white noises that conform to a zero-mean Gaussian distribution, and the expression of the nonlinear function H can be obtained by the above substitution.

Step 5: use the unscented Kalman filter to estimate and compensate the strapdown inertial navigation system error.

The system equations and measurement equations for the initial alignment of the radar-assisted strapdown inertial navigation system are given in steps 3 and 4. The initial alignment task can be completed only by estimating and compensating the state quantities. Because the measurement equation is non-linear, this scheme uses the unscented Kalman filter algorithm for state estimation.

(1) Select the initial filter value $$\hat{X}_0 = EX_0$$

$$P_0 = E[(X_0 - \hat{X}_0)][(X_0 - \hat{X}_0)^T]$$

System dimension n=15
The weights are:

$$W_0^{(m)} = \frac{\lambda}{n+\lambda}, \quad W_0^{(c)} = \frac{\lambda}{n+\lambda} + 1 - a^2 + b, \quad W_i^{(m)} = W_i^{(c)} = \frac{\lambda}{2(n+\lambda)}$$

$$i = 1, 2, \ldots, 2n$$

$\gamma = \sqrt{n+\lambda}$, $\lambda = \alpha^2(n+\kappa) - n$ a is a very small positive number, $10^{-4} \leq \alpha \leq 1$, $\kappa = 3-n$, b=2 can be selected.

(2) Calculate 2n+1 σ samples when k−1 (k=1, 2, 3, ...)

$$\tilde{\chi}_{k-1}^{(0)} = \hat{X}_{k-1}$$

$$\tilde{\chi}_{k-1}^{(i)} = \hat{X}_{k-1} + \gamma(\sqrt{P_{k-1}})_{(i)} \ i=1, 2, \ldots, n$$

$$\tilde{\chi}_{k-1}^{(i)} = \hat{X}_{k-1} - \gamma(\sqrt{P_{k-1}})_{(i-n)} \ i=n+1, n+2, \ldots, 2n$$

(3) A predictive model for computing k time $$\chi_{k/k-1}^{*(i)} = f[\tilde{\chi}_{k-1}^{(i)}, u_{k-1}] \quad i = 0, 1, 2, \ldots, 2n$$

$$\hat{X}_{k/k-1} = \sum_{i=0}^{2n} W_i^{(m)} \chi_{k/k-1}^{*(i)}$$

$$P_{k/k-1} = \sum_{i=0}^{2n} W_i^{(c)} [\chi_{k/k-1}^{*(i)} - \hat{X}_{k/k-1}][\chi_{k/k-1}^{*(i)} - \hat{X}_{k/k-1}]^T + Q_{k-1}$$

(4) Calculate the one-step prediction sample point at the time of k)

$$\chi_{k/k-1}^{(0)} = \hat{X}_{k/k-1}$$

$$\chi_{k/k-1}^{(i)} = \hat{X}_{k/k-1} + \gamma(\sqrt{P_{k/k-1}})_{(i)} \ i=1,2,\ldots,n$$

$$\chi_{k/k-1}^{(i)} = \hat{X}_{k/k-1} - \gamma(\sqrt{P_{k/k-1}})_{(i-n)} \ i=n+1, n+2, \ldots, 2n$$

(5) Calculation $P_{(XZ)k/k-1}$, $P_{(ZZ)k/k-1}$ $$Z_{k/k-1}^{(i)} = h[\chi_{k/k-1}^{(i)}], \quad i = 0, 1, 2, \ldots, 2n$$

-continued $$\hat{Z}_{k/k-1} = \sum_{i=0}^{2n} W_i^{(m)} Z_{k/k-1}^{(i)}$$

$$P_{(XZ)_{k/k-1}} = \sum_{i=0}^{2n} W_i^{(c)} [\chi_{k/k-1}^{(i)} - \hat{X}_{k/k-1}][Z_{k/k-1}^{(i)} - \hat{Z}_{k/k-1}]^T$$

$$P_{(ZZ)_{k/k-1}} = \sum_{i=0}^{2n} W_i^{(c)} [Z_{k/k-1}^{(i)} - \hat{Z}_{k/k-1}][Z_{k/k-1}^{(i)} - \hat{Z}_{k/k-1}]^T + R_k$$

(6) Calculate the gain matrix $$K_k = P_{(XZ)_{k/k-1}} P_{(ZZ)_{k/k-1}}^{-1}$$

(7) Calculate the filter value $$\hat{X}_k = \hat{X}_{k/k-1} + K_k [Z_k - \hat{Z}_{k/k-1}]$$
$$P_k = P_{k/k-1} - K_k P_{(ZZ)_{k/k-1}} K_k^T$$

(8) Through the above process, the navigation error of the strapdown inertial navigation system can be estimated, so as to perform closed-loop correction and complete the initial alignment.

The technical solution of the present invention is simulated and verified in combination with specific values below:

Simulation conditions: the initial position error of the inertial navigation device is set to $10\sqrt{3}$m the parameters of the inertial measurement unit as follows: the constant drift of the gyro is 0.01° h, The random drift is 0.001°/√h, the accelerometer constant bias is $3\times10^{-4}$ g, and the random drift is $5\times10^{-5}$ g√s, the sampling time interval is 10 ms; the slant distance error measured by radar is 10m (1σ), the pitch angle error is 0.1° (1σ), and the azimuth angle error is 0.3° (1σ).

Because the ship's position and attitude are provided by the combination of ship inertial navigation equipment and auxiliary equipment, its position error and attitude error can be ignored. To simplify the simulation complexity, in order to simplify the complexity of simulation, considering that the ship is still and the "true north" provided by the ship is error-free. The height of the radar is 5 m, the update period is 1 s, the filter filtering period is 1s, the filter is closed-loop corrected, the simulation time is set to 300 s; the flight speed is 80 m/s, and the flight height is 1000 m.

Figure 3A:
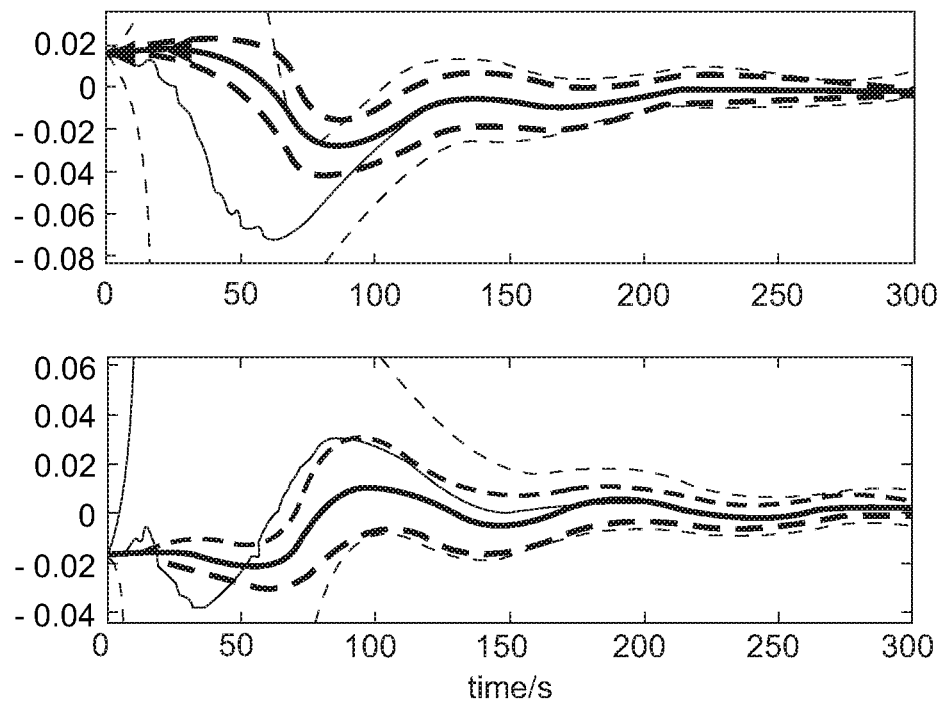
FIG. 3a is a comparison diagram of horizontal attitude error between the present invention and the existing scheme under the condition 1 in simulation experiment.
Figure 3B:
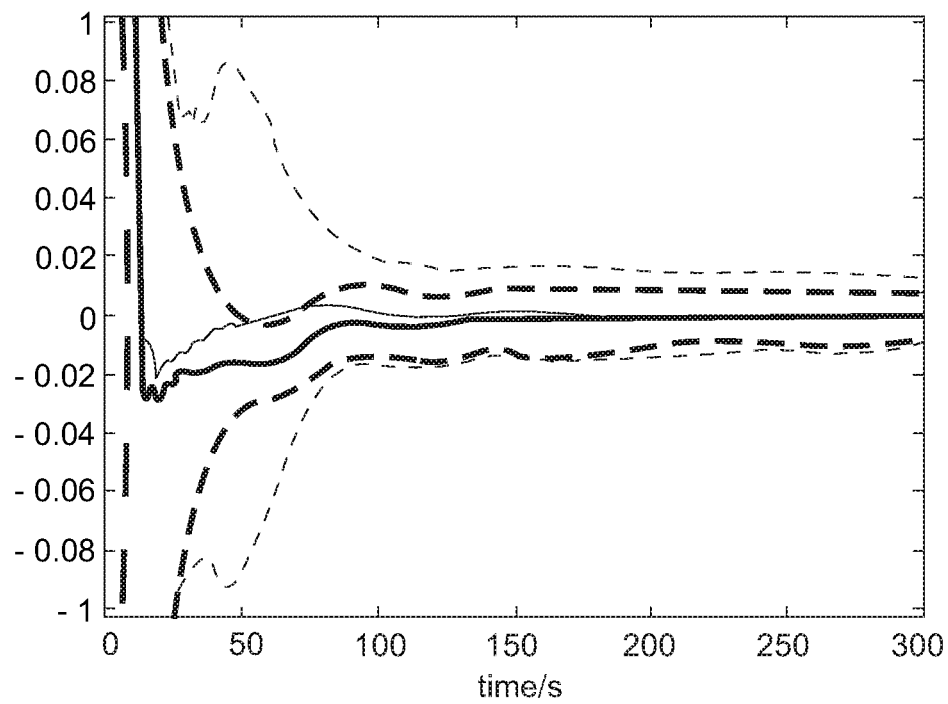
FIG. 3b is a comparison diagram of azimuth attitude error between the present invention and the existing scheme under the condition 1 in simulation experiment.
Figure 4A:
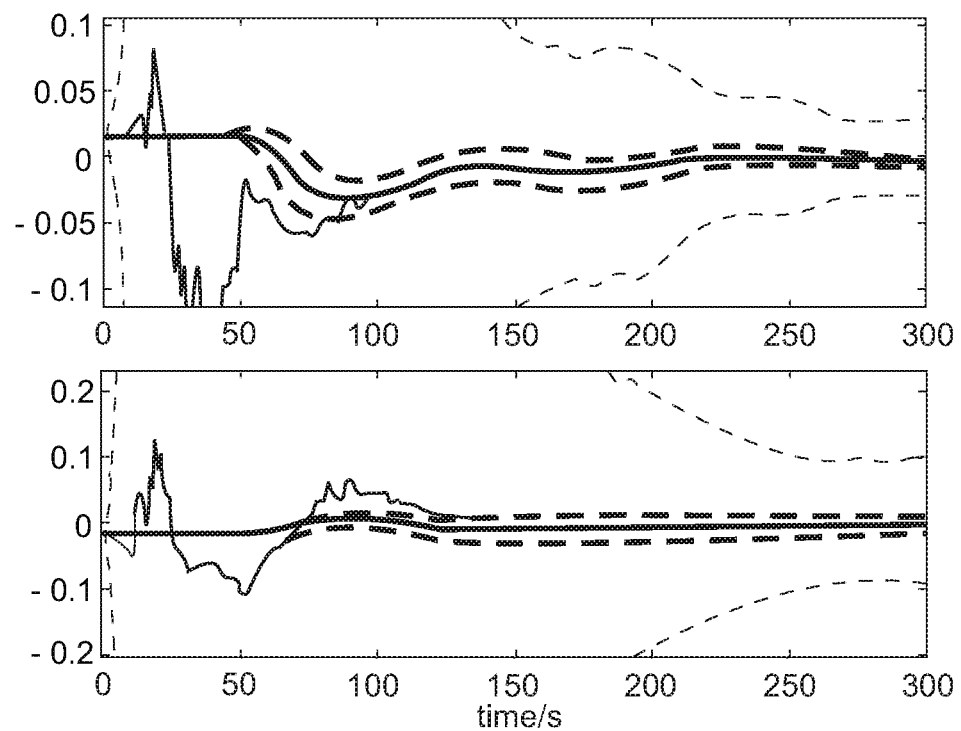
FIG. 4a is a comparison diagram of horizontal attitude error between the present invention and the existing scheme under the condition 2 in simulation experiment.
Figure 4B:
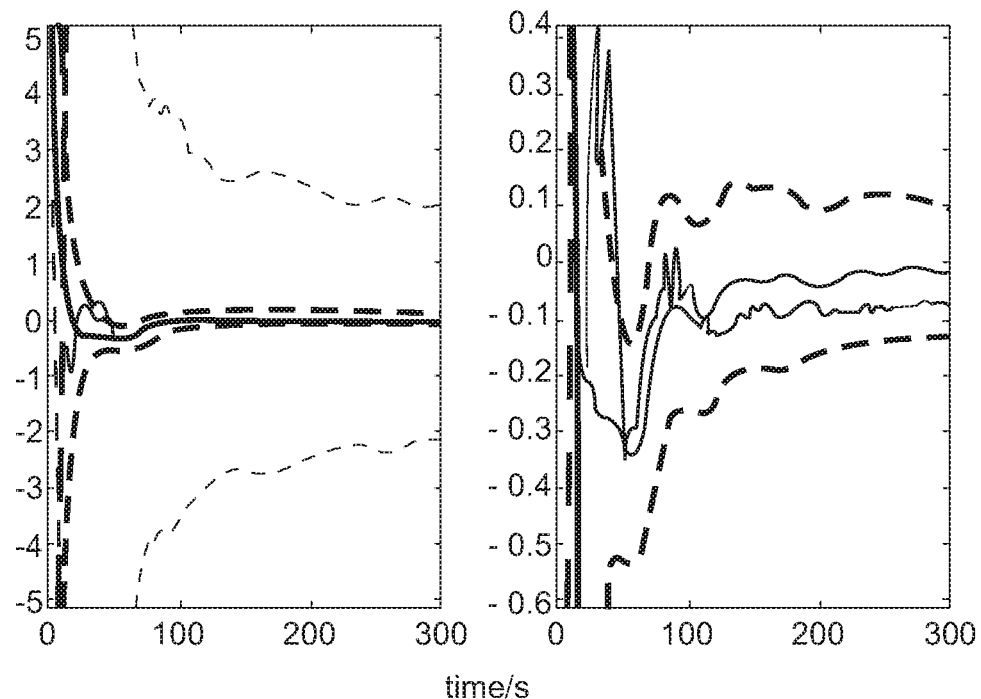

In order to verify the effectiveness of the present invention, the simulation environment is set: the slant distance of simulation condition 1 is less than 10 km, and the slant distance of simulation condition 2 is more than 50 km. Compared with the existing radar-assisted alignment scheme. FIG. 3a and FIG. 3b are the attitude error comparison diagrams of the present invention and the existing scheme for 200 times Monte Carlo simulation results under conditions 1 in simulation experiment. FIG. 4a and FIG. 4b are the attitude error comparison diagrams of the present invention and the existing scheme for 200 times Monte Carlo simulation results under conditions 2 in simulation experiment. Among them, the thin black solid line is the mean curve of the traditional measurement model scheme, and the thin black dashed line is the 3σ curve of the traditional measurement model scheme. Among them, the thick black solid line is the mean curve of the new measurement model scheme, and the thick black dotted line is the 3σ curve of the new measurement model scheme; $\Phi_e$, $\Phi_n$ and $\Phi_u$ are the pitch error angle, the roll error angle, and the heading error angle, respectively.

In summary, the present invention provides a method for initial alignment of radar assisted airborne strapdown inertial navigation system. By calculating the slant distance and angular position between the radar and the airborne inertial navigation equipment, a nonlinear measurement equation for the initial alignment of the radar assisted inertial navigation system is obtained. The unscented Kalman filter algorithm is used to estimate and compensate the error amount of strapdown inertial navigation system to complete the initial alignment task. The significance of the present invention is to provide an in-flight initial alignment solution when the global positioning system is limited, which has fast convergence speed and high estimation accuracy and has high engineering application value.

The invention claimed is:

1. A method for an initial alignment of a radar assisted airborne strapdown inertial navigation system is characterized by the following steps:
   step 1: position and track a target aircraft through a tracking radar configured on a ship;
   step 2: the tracking radar measures a slant distance, an angular position of the target aircraft and a position of the tracking radar which are then provided to the radar assisted airborne strapdown inertial navigation system through wireless transmission;
   step 3: construct an initial alignment state equation of the radar assisted airborne strapdown inertial navigation system;
   step 4: construct a nonlinear measurement equation for the initial alignment of the radar assisted airborne strapdown inertial navigation system;
   step 5: use an unscented Kalman filter to estimate and compensate an inertial navigation error.

2. The method for the initial alignment of the radar assisted airborne strapdown inertial navigation system according to claim 1, wherein the step 3 specifically includes:
   a state X is selected as:

$$X = [\phi^T (\delta v^n)^T (\delta P)^T (\varepsilon^b)^T (\nabla^b)^T]^T,$$

where: n is a navigation coordinate system, which coincides with a local geographic coordinate system, and its x, y, and z axes point to east, north, and vertical, respectively; b is a carrier coordinate system, and its x, y, and z point to right, front and top of a carrier; $\delta P = [\delta L \ \delta \lambda \ \delta h]^T$ is a position error vector, $\delta L$ is a latitude position error, $\delta \lambda$ a is a longitude position error, $\delta h$ is a height position error; $\delta v^n = [\delta v_E \ \delta v_N \ \delta v_U]^T$ is a speed error vector, $\delta v_E$ is an eastward velocity error, $\delta v_N$ is a northward velocity error, $\delta v_U$ is a celestial velocity error; $\phi = [\phi_e \ \phi_n \ \phi_u]^T$ is a platform misalignment angle vector, $\phi_e$, $\phi_n$ and $\phi_u$ are platform misalignment angles in the east, north, and vertical directions, respectively; $\varepsilon^b = [\varepsilon_x \ \varepsilon_y \ \varepsilon_z]^T$ is a constant drift vector of a gyro, $\varepsilon_x$, $\varepsilon_y$ and $\varepsilon_z$ are constant drifts of the gyro in the x, y, and z axes, respectively, $\nabla^b = [\nabla_x \ \nabla_y \ \nabla_z]^T$ is an accelerometer constant bias vector, and $\nabla_x$, $\nabla_y$, $\nabla_z$ are accelerometer constant biases in the x, y, and z axes respectively;
   according to the selected state X, the initial alignment state equation of the radar assisted airborne strapdown inertial navigation system is $$\begin{cases} \dot{\phi} = -\omega_{in}^n \times \phi + M_{12}\delta v^n + M_{13}\delta P - C_b^n(\varepsilon^b + \varepsilon_w^b) \\ \delta \dot{v}^n = (C_b^n f^b) \times \phi + (v^n \times M_{12} - [(2\omega_{ie}^n + \omega_{en}^n) \times])\delta v^n + \\ \qquad\qquad M_{23}\delta P + C_b^n(\nabla^b + \nabla_w^b) \\ \delta \dot{P} = M_{32}\delta v^n + M_{33}\delta P \\ \dot{\varepsilon}^b = 0 \\ \dot{\nabla}^b = 0 \end{cases}$$

where: $\omega_{in}^n = \omega_{ie}^n + \omega_{en}^n$ is a projection of a rotation angular velocity of the navigation coordinate system relative to an inertial system on the navigation coordinate system, which includes two vector parts: $\omega_{ie}^n$ is a projection vector of an earth's rotation angular velocity in the navigation coordinate system, $\omega_{en}^n$ is a projection vector of a rotation angular velocity of the navigation coordinate system relative to the inertial system caused by a movement of the carrier on a surface of the earth in the navigation coordinate system, $$\omega_{ie}^n = [\,0 \quad \omega_{ie}\cos L \quad \omega_{ie}\sin L\,]^T,$$

$$\omega_{en}^n = \left[\frac{-v_N}{R_h} \quad \frac{v_E}{R_h} \quad \frac{v_E\tan L}{R_h}\right]^T$$

and $\omega_{ie}$ is an earth's rotation angular rate scalar, L is a local latitude, $R_h$ is a distance between the carrier and a center of the earth, where $R_h = R_e + h$, $R_e$ is a radius of the earth, h is an altitude of the carrier, $v^n = [v_E \; v_N \; v_U]^T$ is a projection of a carrier velocity vector in the navigation coordinate system, $v_E$, $v_N$, and $v_U$ are an east velocity, a north velocity, and a vertical velocity, respectively, $f^b$ is a specific force vector of an accelerometer output carrier coordinate system, $$M_{12} = \begin{bmatrix} 0 & -1/R_h & 0 \\ 1/R_h & 0 & 0 \\ \tan L/R_h & 0 & 0 \end{bmatrix},$$

$$M_{13} = \begin{bmatrix} 0 & 0 & 0 \\ -\omega_{ie}\sin L & 0 & 0 \\ \omega_{ie}\cos L & 0 & 0 \end{bmatrix} + \begin{bmatrix} 0 & 0 & v_N/R_h^2 \\ 0 & 0 & -v_E/R_h^2 \\ v_E\sec^2 L/R_h & 0 & -v_E\tan L/R_h^2 \end{bmatrix},$$

$$M_{23} = (v^n \times)\left(2 \cdot \begin{bmatrix} 0 & 0 & 0 \\ -\omega_{ie}\sin L & 0 & 0 \\ \omega_{ie}\cos L & 0 & 0 \end{bmatrix} + \begin{bmatrix} 0 & 0 & v_N/R_h^2 \\ 0 & 0 & -v_E/R_h^2 \\ v_E\sec^2 L/R_h & 0 & -v_E\tan L/R_h^2 \end{bmatrix}\right),$$

$$M_{32} = \begin{bmatrix} 0 & 1/R_h & 0 \\ \sec L/R_h & 0 & 0 \\ 0 & 0 & 1 \end{bmatrix},$$

$$M_{33} = \begin{bmatrix} 0 & 0 & -v_N/R_h^2 \\ v_E\sec L\tan L/R_h & 0 & -v_E\sec L/R_h^2 \\ 0 & 0 & 0 \end{bmatrix} \text{ and}$$

$$C_b^n = \begin{bmatrix} T_{11} & T_{12} & T_{13} \\ T_{21} & T_{22} & T_{23} \\ T_{31} & T_{32} & T_{33} \end{bmatrix}$$

is an attitude matrix of a sub-inertial navigation, $T_{11}$, $T_{12}$, $T_{13}$, $T_{21}$, $T_{22}$, $T_{23}$, $T_{31}$, $T_{32}$ and $T_{33}$ are elements of the attitude matrix, $\varepsilon_w^b = [\varepsilon_{wx}^b \; \varepsilon_{wy}^b \; \varepsilon_{wz}^b]^T$ is a Gaussian white noise vector measured by the gyro, $\varepsilon_{wx}^b$, $\varepsilon_{wy}^b$ and $\varepsilon_{wz}^b$ are x, y, z axis gyro measurement Gaussian white noises respectively, $\nabla_w^b = [\nabla_{wx}^b \; \nabla_{wy}^b \; \nabla_{wz}^b]^T$ is a white Gaussian vector of accelerometer measurement, and $\nabla_{wx}^b$, $\nabla_{wy}^b$ and $\nabla_{wz}^b$ are white Gaussian of x, y and z axial acceleration measurement.

3. The method for the initial alignment of the radar assisted airborne strapdown inertial navigation system according to claim 2, wherein step 4 specifically includes:
a measurement $Z = [R \; \beta \; \alpha]^T$ includes the slant distance R, an azimuth angle $\beta$ and a pitch angle $\alpha$; where $$Z = \begin{bmatrix} R \\ \beta \\ \alpha \end{bmatrix} = \begin{bmatrix} \sqrt{(dx^n)^2 + (dy^n)^2 + (dz^n)^2} \\ \arctan\dfrac{dz^n}{\sqrt{(dx^n)^2 + (dy^n)^2}} \\ \arctan\dfrac{dx^n}{dy^n} \end{bmatrix},$$

$$[\,dx^n \; dy^n \; dz^n\,]^T = C_{p_o}^n[\,dx^e \; dy^e \; dz^e\,]^T$$

are relative position vectors of the target aircraft and the tracking radar in the navigation coordinate system, $C_{p_o}^n$ is a coordinate conversion matrix between an earth's rectangular coordinate system and the navigation coordinate system, a coordinate of the earth's rectangular coordinate system is $$\begin{bmatrix} dx^e \\ dy^e \\ dz^e \end{bmatrix} = \begin{bmatrix} (R_e + h_p)\cos(L_p)\cos(\lambda_p) \\ (R_e + h_p)\cos(L_p)\sin(\lambda_p) \\ (R_e + h_p)\sin(L_p) \end{bmatrix} - \begin{bmatrix} x_{p_o}^e \\ y_{p_o}^e \\ z_{p_o}^e \end{bmatrix},$$

e represents the Earth's rectangular coordinate system, $L_p = L_p^s - \delta L$ is a true latitude, $\lambda_p = \lambda_p^s - \delta\lambda$ is a true longitude, $h_p = h_p^s - \delta h$ is a true altitude, and $L_p^s$, $\lambda_p^s$ and $h_p^s$ are positions resolved by the inertial navigation system,
then a measurement equation for the initial alignment of the radar assisted airborne strapdown inertial navigation system is $$Z = H(\delta L, \delta\lambda, \delta h) + \begin{bmatrix} \omega_R \\ \omega_\beta \\ \omega_\alpha \end{bmatrix},$$

where: $\omega_R$, $\omega_\alpha$ and $\omega_\beta$ are white noises that conform to a zero-mean Gaussian distribution, and an expression of a nonlinear function H is obtained by substitution.

\* \* \* \* \*